(12) United States Patent
Kim et al.

(10) Patent No.: US 8,040,851 B2
(45) Date of Patent: Oct. 18, 2011

(54) METHOD AND SYSTEM OF REDUCING HANDOVER TIME IN MOBILE IP NETWORK

(75) Inventors: Soo-Hwan Kim, Suwon-si (KR); Kil-Lyeon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 803 days.

(21) Appl. No.: 12/078,055

(22) Filed: Mar. 26, 2008

(65) Prior Publication Data

US 2008/0240041 A1  Oct. 2, 2008

(30) Foreign Application Priority Data

Mar. 28, 2007 (KR) .................. 10-2007-0030436

(51) Int. Cl.
*H04Q 7/00* (2006.01)
*H04W 36/00* (2009.01)

(52) U.S. Cl. ........................ 370/331; 455/442
(58) Field of Classification Search .................. None
See application file for complete search history.

(56) References Cited

U.S. PATENT DOCUMENTS

| 2002/0085518 | A1* | 7/2002 | Lim | 370/331 |
| 2006/0268817 | A1* | 11/2006 | Yokota et al. | 370/349 |
| 2008/0151815 | A1* | 6/2008 | Bedekar et al. | 370/328 |
| 2010/0046469 | A1* | 2/2010 | Kang et al. | 370/331 |

FOREIGN PATENT DOCUMENTS

| EP | 1011241 A1 | 6/2000 |
| KR | 2001-0054331 | 7/2001 |
| KR | 2003-0010264 | 2/2003 |
| KR | 2003-0026436 | 4/2003 |
| WO | WO 2008069356 A1 * | 6/2008 |

OTHER PUBLICATIONS

"Decision of Grant" issued by Korean Intellectual Property for present application's Priority Document KR2007-0030436 on Nov. 28, 2008.

* cited by examiner

*Primary Examiner* — Hassan Phillips
*Assistant Examiner* — Eunsook Choi
(74) *Attorney, Agent, or Firm* — H.C. Park & Associates, PLC

(57) ABSTRACT

A method and system of reducing handover time in a mobile IP network. An Foreign Agent (FA), when a terminal carries out a handover between mobile Internet Protocol Version-4 (IPv4) sub-networks of the Foreign Agent (FA), identifies whether or not a registration request message from the terminal is transmitted from an entry of a visitor list of the Foreign Agent (FA). If the registration request message is transmitted from the entry of the visitor list, interface information of a corresponding one of the sub-networks, to which the terminal registered in the visitor list is connected, is updated. A registration reply message is generated in response to the registration request message, and is transmitted to the terminal.

11 Claims, 4 Drawing Sheets

METHOD AND SYSTEM OF REDUCING HANDOVER TIME IN MOBILE IP NETWORK

CLAIM OF PRIORITY

This application makes reference to, incorporates the same herein, and claims all benefits accruing under 35 U.S.C. §119 from an application for METHOD AND SYSTEM FOR HANDOVER TIME REDUCING IN MOBILE IP NETWORK earlier filed in the Korean Intellectual Property Office on 28 Mar. 2007 and there duly assigned Serial No. 2007-0030436.

BACKGROUND OF THE INVENTION

1. Field of the Invention

The present invention relates to a method and system of reducing handover time in a mobile Internet Protocol (IP) network, and more particularly, to a method and system by which, when a Mobile Node (MN) carries out a handover between two sub-networks managed by a single Foreign Agent (FA) having two or more sub-networks, a Home Agent (HA) registration for the Mobile Node (MN) may be omitted in order to minimize a handover delay.

2. Description of the Related Art

Mobile Internet Protocol (IP) is an Internet Engineering Task Force standard communications protocol designed to allow users of mobile devices moving between different networks while having a permanent IP address. Mobile Internet Protocol has two kinds of entities, i.e., a Home Agent (HA) storing information of mobile nodes whose permanent addresses are stored in the home agent's network, and a Foreign Agent (FA) storing information of mobile nodes visiting the foreign agent's network.

In a contemporary mobile Internet Protocol (IP) network, in a handover of a Mobile Node (MN), when the Mobile Node (MN) is migrated from one sub-network to another, this Mobile Node (MN) recognizes its own presence in a new sub-network based on either prefix information or lifetime information of an agent advertisement message, received from the new network, or based on the termination of lifetime of an agent advertisement message when the agent advertisement message is not received until the lifetime is terminated.

Then, the Mobile Node (MN) sends a Home Agent (HA) registration request message to the Home Agent (HA) via a Foreign Agent (FA) in order to inform the Home Agent (HA) that the Mobile Node (MN) is migrated to a new network. When the registration request message is received, the Foreign Agent (FA) generates a pending registration request entry of a visitor list using message information, and then transmits the registration request message to the Home Agent (HA).

Accordingly, the Home Agent (HA) updates mobility binding list information of the Mobile Node (MN) by using the registration request message, validates the registration request message, and sends the result on a registration reply message via the Foreign Agent (FA) to the Mobile Node (MN).

When the registration reply message is received, the Foreign Agent (FA) identifies the contents of the message. If the result of the registration request is successful, the Foreign Agent (FA) searches the visitor list for the pending registration request having the same Mobile Node (MN) home address, and registers as a normal entry. If the search result is unsatisfactory, the Foreign Agent (FA) discards the registration reply message.

Then, the Foreign Agent (FA) transmits the registration reply message to the Mobile Node (MN), and the Mobile Node (MN) judges whether or not the entire registration procedure is successful based on the result of the received registration reply message.

In the contemporary mobile IP network, however, when the Mobile Node (MN) carries out a handover, the registration request message is transmitted to the Home Agent (HA) via the Foreign Agent (FA) in all cases irrespective whether or not the handover is carried out between sub-networks of same Foreign Agent (FA), so that the mobility binding list managed by the Home Agent (HA) is updated. Therefore, in the case where handover happens in one Foreign Agent (FA), mobility binding list managed by Home Agent (HA) is not required to be updated. Therefore, in a contemporary handover process, a time delay due to unnecessary update of mobility binding list in the case where handover happens in one Home Agent (HA) should be eliminated to improve the efficiency of IP mobile system.

SUMMARY OF THE INVENTION

It is, therefore, an object of the present invention to provide an improved method and system using mobile internet protocol to overcome the above stated disadvantages.

It is another object of the present invention to provide a method and system of reducing handover time in a mobile IP network, by which, when a handover is carried out between sub-networks of the same Foreign Agent (FA) in a mobile IP network, the Foreign Agent (FA) examines a registration request message from an Mobile Node (MN), and if the Mobile Node (MN) is recorded in a visitor list thereof, omits a procedure of sending the registration message to an Home Agent (HA), so that a handover delay may be reduced.

According to an aspect of the present invention, the method of reducing handover time in a mobile IP network includes steps of, at a Foreign Agent (FA), when a terminal carries out a handover between mobile Internet Protocol networks such as, by way of examples, Version-4 (IPv4), sub-networks of the Foreign Agent (FA), identifying whether or not a registration request message from the terminal is transmitted from an entry of a visitor list of the Foreign Agent (FA); if the registration request message is transmitted from the entry of the visitor list, updating interface information of a corresponding one of the sub-networks to which the terminal registered in the visitor list is connected; and generating a registration reply message in response to the registration request message and transmitting the registration reply message to the terminal.

In the procedure of updating interface information of a corresponding one of the sub-networks to which the terminal registered in the visitor list is connected, the interface information of the corresponding sub-network may update IP information of the terminal.

In the procedure of generating a registration reply message in response to the registration request message and transmitting the registration reply message to the terminal, the Foreign Agent (FA) itself may generate the registration reply message and transmit the registration reply message to the terminal.

The method may further include steps of, at the terminal, receiving the registration reply message and identifying whether or not registration of the terminal is successful; and if the registration of the terminal is successful, receiving a packet from an Home Agent (HA) in the updated sub-network, which is recorded in the visitor list.

According to another aspect of the present invention, the system of reducing handover time in a mobile IP network may include a router. In a handover of a terminal between sub-networks of the mobile IP network, if a registration request message from the terminal is transmitted from an entry of a visitor list managed by the router, the router updates interface information of a corresponding one of the sub-networks to which the terminal registered in the visitor list is connected, generates a registration reply message in response to the registration request message, and transmits the registration reply message to the terminal.

The router may include a judgment module for judging whether or not the terminal, from which the registration message is transmitted, is identical to one of terminals in the visitor list; an update module for updating the interface information of the corresponding sub-network in the visitor list if the terminal, from which the registration message is transmitted, is identical with one of terminals in the visitor list; and a message generator module for generating the registration reply message in response to the registration request message and transmitting the registration reply message to the terminal.

The router may have a plurality of the sub-networks, and the visitor list may include interface information of the sub-networks.

The router may update IP information of the terminal registered in the visitor list, and the IP information is the interface information of the corresponding sub-network to which the terminal is connected.

The router may generate the registration reply message by itself to transmit to the terminal.

The router may transmit a packet from an Home Agent (HA) to the updated sub-network of the visitor list after the terminal is successfully registered.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE PREFERRED EMBODIMENTS

Figure 1:
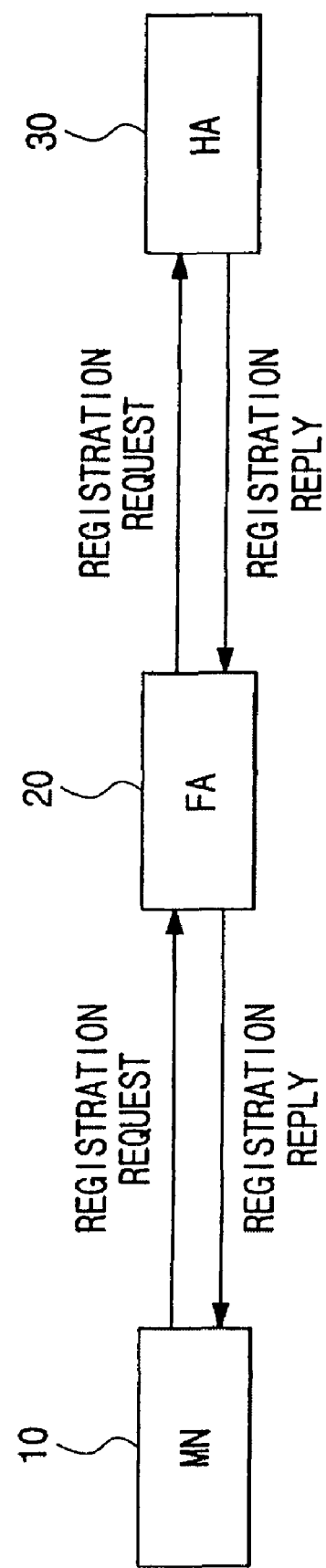
FIG. 1 is a schematic view illustrating a handover process in a contemporary mobile IP network.

The present invention will now be described more fully hereinafter with reference to the accompanying drawings, in which preferred embodiments thereof are shown. Reference now should be made to the drawings, in which the same reference numerals and signs are used throughout the different drawings to designate the same or similar components. In the following description of the present invention, a detailed description of known functions and components incorporated herein will be omitted when redundant description may make the subject matter of the present invention rather unclear.

FIG. 1 is a schematic view illustrating a handover process in a contemporary mobile IP network.

As shown in FIG. 1, according to a typical mobile IP technology, in the handover of a terminal or Mobile Node (MN) 10, a registration request message is sent to a Home Agent (HA) 30 via a Foreign Agent (FA) 20 from Mobile Node (MN) 10.

Accordingly, Home Agent (HA) 30 updates mobility binding list information of Mobile Node (MN) 10 by using the registration request message, validates the registration request message and sends the result on a registration reply message via Foreign Agent (FA) 20 to Mobile Node (MN) 10.

When the registration reply message is received by Foreign Agent (FA) 20, Foreign Agent (FA) 20 identifies the contents of the received registration reply message. If the result of the registration request is successful, Foreign Agent (FA) 20 searches the visitor list for the pending registration request having the same Mobile Node (MN) home address, and registers as a normal entry. If the search result is unsatisfactory, the Foreign Agent (FA) 20 discards the registration reply message.

Then, Foreign Agent (FA) 20 transmits the registration reply message to Mobile Node (MN) 10, and Mobile Node (MN) 10 judges whether or not the entire registration procedure is successful based on the result of the received registration reply message.

Therefore, in the contemporary handover process in a general mobile IP network, the mobility binding list managed by Home Agent (HA) 30 is updated for all cases (irrespective whether or not the handover is carried out between sub-networks of the same FA).

In the case where handover happens in one Foreign Agent (FA), however, mobility binding list managed by Home Agent (HA) 30 is not required to be updated. Therefore, in the contemporary handover process, a time delay due to unnecessary update of mobility binding list in the case where handover happens in one Foreign Agent (FA) should be eliminated to improve the efficiency of IP mobile system.

In the handover of the Mobile Node (MN) between two or more sub-networks of the same Foreign Agent (FA), however, the registration request message is not sent to the Home Agent (HA), but visitor list information of the Foreign Agent (FA) is changed. When packets, transmitted from the Home Agent (HA) to the existing care-of-address (i.e., a temporary IP address during the migration of the Mobile Node) of the Mobile Node (MN), are sent to the Foreign Agent (FA), the Foreign Agent (FA) forwards the packets to a new sub-network of the Mobile Node (MN), thereby reducing a handover delay.

Figure 2:
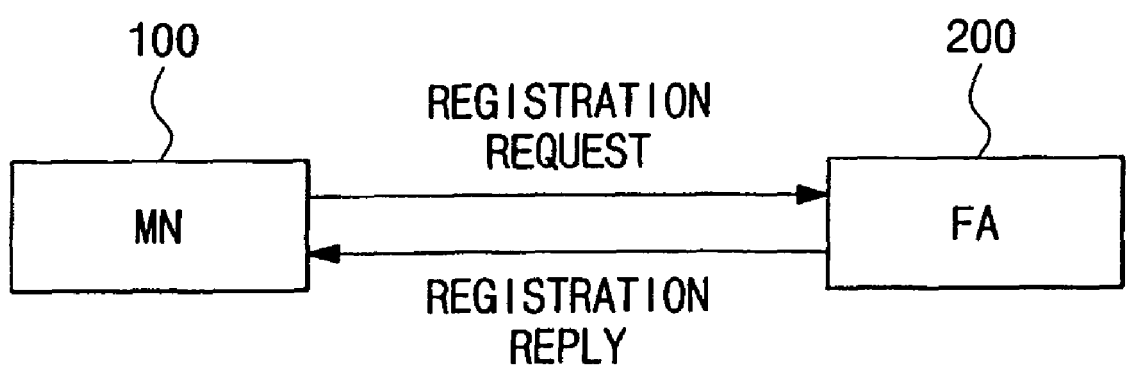
FIG. 2 is a schematic view illustrating an architecture of a system of reducing handover time in a mobile IP network constructed according to the principles of the present invention.
Figure 3:
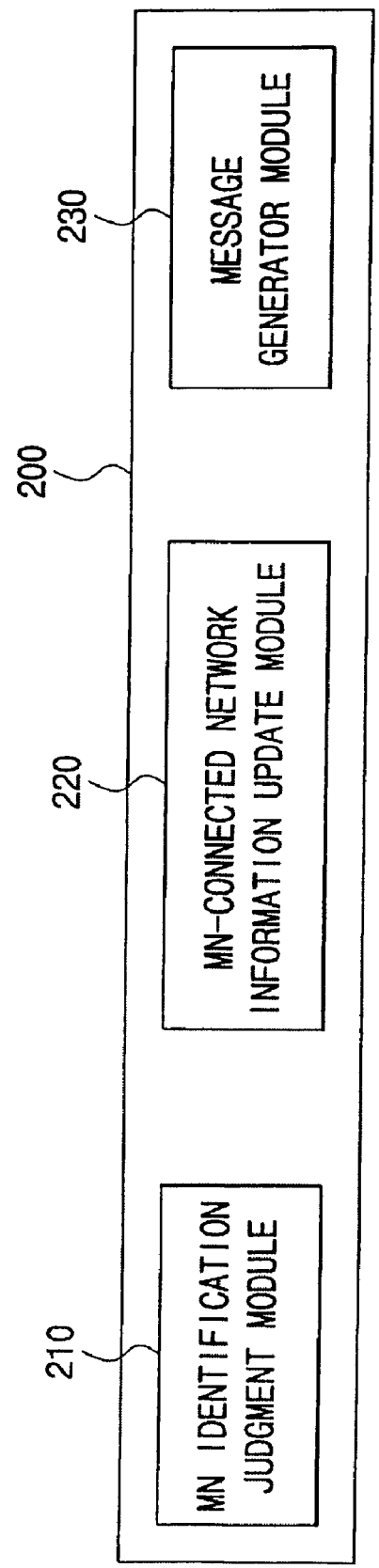
FIG. 3 is a block diagram illustrating a detailed structure of the Foreign Agent (FA) as shown in FIG. 2.

FIG. 2 is a schematic view illustrating an architecture of a system of reducing handover time in a mobile IP network constructed according to the principles of the present invention, and FIG. 3 is a block diagram illustrating a detailed structure of the Foreign Agent (FA) as shown in FIG. 2.

As shown in FIGS. 2 and 3, the system of the present invention includes a terminal or Mobile Node (MN) 100 for carrying out a handover between two or more sub-networks of a Foreign Agent (FA) 200 in a mobile Internet Protocol Version-4 (IPv4) network, and the Foreign Agent (FA) 200 for processing a registration request message from Mobile Node (MN) 100 to reduce a handover delay. Therefore, time of updating mobility binding list by the home agent is eliminated. Herein, Foreign Agent (FA) 200 may be implemented with a router. The present invention is not necessarily limited into IPv4 network but is applicable to various mobile IP networks.

Particularly, as shown in FIG. 3, when the mobile Internet Protocol Version-4 (IPv4) network includes two or more sub-networks, Foreign Agent (FA) 200 includes an Mobile Node (MN) identification judgment module 210, an Mobile Node (MN)-connected network information update module 220 and a message generator module 230. Mobile Node (MN) identification judgment module 210 judges whether or not the Mobile Node (MN), from which the registration message is transmitted, is identical to one of Mobile Node (MN)s in the visitor list of judgment module 210 (or Foreign Agent (FA) 200). MN-connected network information update module 220 updates the interface information of the sub-network in the visitor list if the Mobile Node (MN), from which the registration message is transmitted, is identical with one of the MNs in the visitor list. Message generator module 230 generates the registration reply message in response to the registration request message to transmit to Mobile Node (MN).

When Foreign Agent (FA) 200 has a plurality of sub-networks, the visitor list information of Foreign Agent (FA) 200 includes interface information of the sub-networks. Particularly, in the case where Foreign Agent (FA) 200 has only one sub-network, the visitor list of the Foreign Agent (FA) may not have the interface information of the sub-network. If there are a plurality of sub-networks, however, packets from the Home Agent (HA) cannot be correctly transmitted to the Mobile Node (MN) without interface information of a sub-network to which the Mobile Node (MN) is connected or belongs.

According to the present invention, in the case where Mobile Node (MN) 100 carries out a handover between a plurality of sub-networks of Foreign Agent (FA) 200, when Foreign Agent (FA) 200 receives a registration request message from Mobile Node (MN) 100, Foreign Agent (FA) 200 can correctly send a packet by merely changing the interface information in the visitor list and also omit a registration procedure to the Home Agent (HA), thereby reducing handover time.

Hereinafter a process of carrying out a fast handover in an Internet Protocol Version-4 (IPv4) network will be described with reference to FIG. 4.

Figure 4:
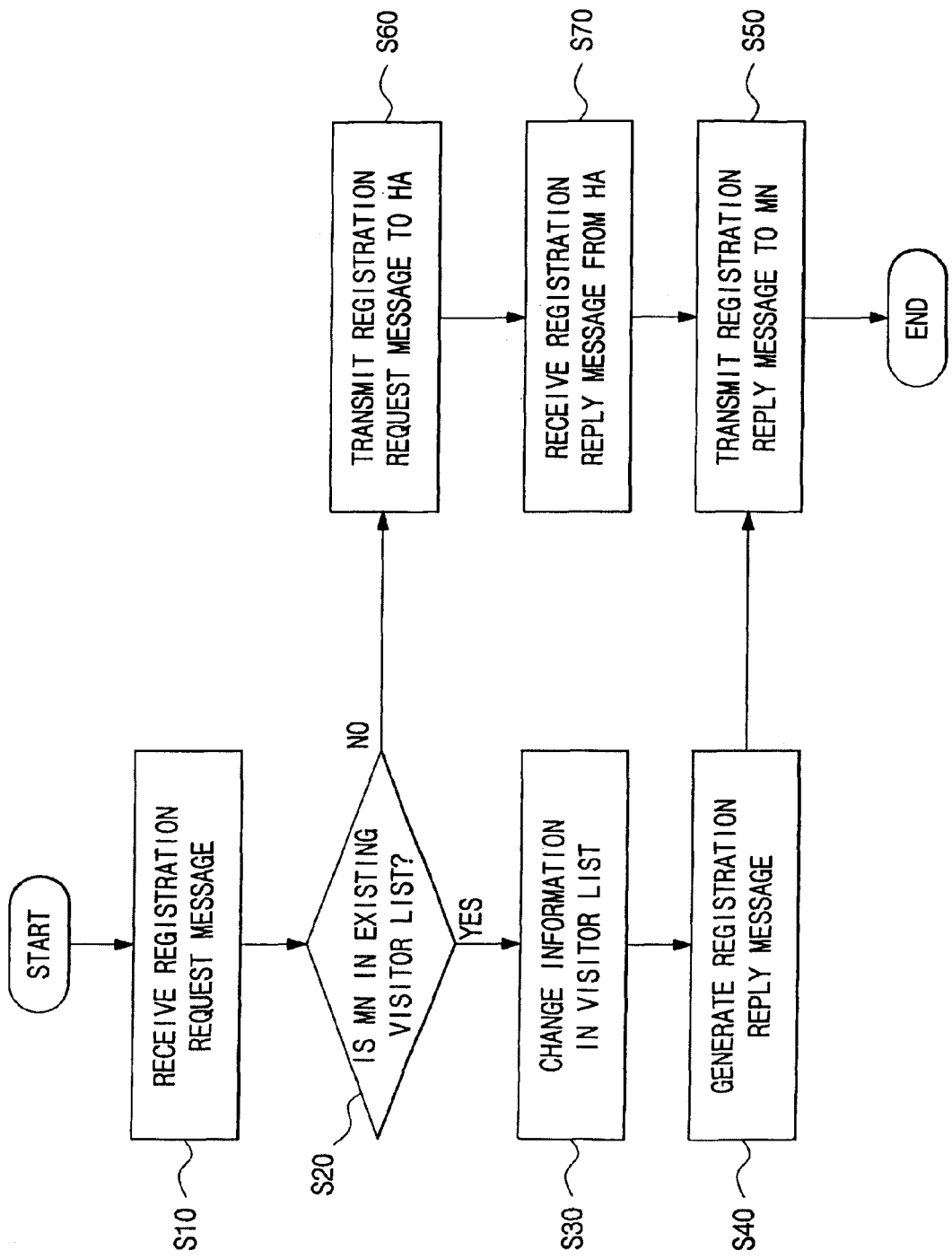
FIG. 4 is a flowchart illustrating a process of reducing handover time in a mobile IP network constructed according to the principles of the present invention.

FIG. 4 is a flowchart illustrating a process of reducing handover time in a mobile IP network constructed according to the principles of the present invention.

As shown in FIG. 4, in the case where an Foreign Agent (FA) has two or more sub-networks, an Mobile Node (MN) belonging to one of the sub-networks attempts to handover to another sub-network of this Foreign Agent (FA). After the Mobile Node (MN) is migrated to the new sub-network, the Mobile Node (MN) recognizes its own presence in the new sub-network based on an agent advertisement message or so on.

In step S10, the Mobile Node (MN) transmits a registration request message to the Foreign Agent (FA), thereby notifying the Foreign Agent (FA) that the Mobile Node (MN) is migrated to another sub-network, and the Foreign Agent (FA) receives the registration request message from the Mobile Node (MN).

In step S20, the Foreign Agent (FA) judges whether or not the Mobile Node (MN) is identical to one of Mobile Node (MN)s in the visitor list of all sub-networks, managed by the Foreign Agent (FA), in order to judge whether or not the handover of the Mobile Node (MN) is between the sub-networks of this Foreign Agent (FA).

If the Mobile Node (MN) is identical to one of the Mobile Node (MN)s in the visitor list, the Foreign Agent (FA) does not send the registration request message to the Home Agent (HA) but changes interface information of the sub-network of the Mobile Node (MN) from a previous one to a new one in step S30.

Next, the Foreign Agent (FA) itself generates a registration reply message, which will be sent to the Mobile Node (MN), in step S40, and transmits the generated registration reply message to the Mobile Node (MN) in step S50.

Accordingly, the Mobile Node (MN) receives the registration reply message from the Foreign Agent (FA) to judge whether or not a registration procedure is successfully completed.

If the registration procedure is successfully finished, the Home Agent (HA) sends a packet to the Mobile Node (MN) via the Foreign Agent (FA), which then transmits the packet to the new sub-network based on changed visitor list information.

In this case, the Home Agent (HA) may send the packet to the Mobile Node (MN) using previously registered care-of-address irrespective whether or not the Mobile Node (MN) carries out the handover.

If the Mobile Node (MN) is not identical to one of the Mobile Node (MN)s in the visitor list as the result of step S20, the Foreign Agent (FA) transmits the registration request message from the Mobile Node (MN) to the Home Agent (HA) in step S60.

Accordingly, the Foreign Agent (FA) receives the registration reply message from the Home Agent (HA), in response to the registration request message, in step S70, and transmits the registration reply message to the Mobile Node (MN) in step S50.

According to the present invention as set forth above, when an Mobile Node (MN) carries out a handover between sub-networks of the same Foreign Agent (FA), a registration procedure can be omitted to reduce a handover delay, so that the handover can be more efficiently and quickly carried out.

While the present invention has been shown and described in connection with the preferred embodiments, it will be apparent to those skilled in the art that modifications and variations can be made without departing from the spirit and scope of the present invention as defined by the appended claims.

What is claimed is:

1. A method of reducing handover time in a mobile Internet protocol network, the method comprising:
when a terminal carries out a handover between mobile Internet protocol sub-networks of a foreign agent, determining, at the foreign agent, whether a registration request message from the terminal is transmitted from a terminal registered in a visitor list of the foreign agent;
when the registration request message is transmitted from a terminal registered in the visitor list, updating interface information of a corresponding one of the sub-networks to which the terminal registered in the visitor list is connected; and
generating a registration reply message in response to the registration request message and transmitting the registration reply message to the terminal,
wherein generating the registration reply message in response to the registration request message and transmitting the registration reply message to the terminal comprises generating and transmitting the registration reply message without forwarding or transmitting the registration request message to a home agent of the terminal.

2. The method according to claim 1, wherein updating interface information of the corresponding one of the sub-networks to which the terminal registered in the visitor list is connected comprises updating, by the interface information of the corresponding sub-network, Internet protocol information of the terminal.

3. The method according to claim 1, wherein generating a registration reply message in response to the registration request message and transmitting the registration reply message to the terminal further comprises generating, by the foreign agent, the registration reply message and transmitting the registration reply message to the terminal.

4. The method according to claim 1, further comprising:
   at the terminal, receiving the registration reply message and determining whether registration of the terminal is successful; and
   when the registration of the terminal is successful, receiving a packet from the home agent of the terminal.

5. A system of reducing handover time in a mobile Internet protocol network, the system comprising:
   a router; and
   a terminal migrating between sub-networks of the mobile Internet protocol network,
   wherein, in response to a registration request message from the terminal being transmitted from a terminal registered in a visitor list managed by the router, the router performs an update of interface information of a corresponding one of the sub-networks to which the terminal registered in the visitor list is connected, generates a registration reply message in response to the registration request message, and transmits the registration reply message to the terminal, and
   wherein generating the registration reply message in response to the registration request message and transmitting the registration reply message to the terminal comprises generating and transmitting the registration reply message without forwarding or transmitting the registration request message to a home agent of the terminal.

6. The system according to claim 5, with the router comprises:
   a judgment module to determine whether the terminal, from which the registration message is transmitted, is identical to one of terminals registered in the visitor list;
   an update module to update the interface information of the corresponding one of the sub-networks in the visitor list if the terminal, from which the registration message is transmitted, is identical with one of terminals registered in the visitor list; and
   a message generator module to generate the registration reply message in response to the registration request message and to transmit the registration reply message to the terminal.

7. The system according to claim 5, wherein the router is connected to the sub-networks, and wherein the visitor list comprises interface information of the sub-networks.

8. The system according to claim 5, wherein the router updates Internet protocol information of the terminal registered in the visitor list, the Internet protocol information comprising the interface information of the corresponding one of the sub-networks to which the terminal is connected.

9. The system according to claim 5, wherein the router generates the registration reply message and transmits the registration reply message to the terminal.

10. The system according to claim 5, wherein the router transmits a packet from the home agent to the updated sub-network of the visitor list after the terminal is successfully registered.

11. A method, comprising:
    determining whether a terminal is migrating between two sub-networks connected to a single foreign agent by determining, at the foreign agent, whether a registration request message from the terminal is transmitted from a terminal registered in a visitor list of the foreign agent;
    when the terminal is determined to be migrating between the two sub-networks, generating, at the foreign agent, a first registration reply message in response to the registration request message, and transmitting the first registration reply message to the terminal; and
    when the terminal is determined to be migrating between different foreign agents, generating, at a home agent, a second registration reply message in response to the registration request message, and transmitting the second registration reply message to the terminal,
    wherein generating and transmitting the first registration reply message comprises generating and transmitting the first registration reply message without forwarding or transmitting the registration request message to the home agent of the terminal.

* * * * *